July 19, 1932.   W. L. DREW   1,868,350
MACHINE FOR PRODUCING SELF IGNITING CIGARETTES
Filed June 13, 1927   9 Sheets-Sheet 1

WITNESSES:

INVENTOR:
Walter L. Drew,
BY
Joshua R. H. Potts
ATTORNEY

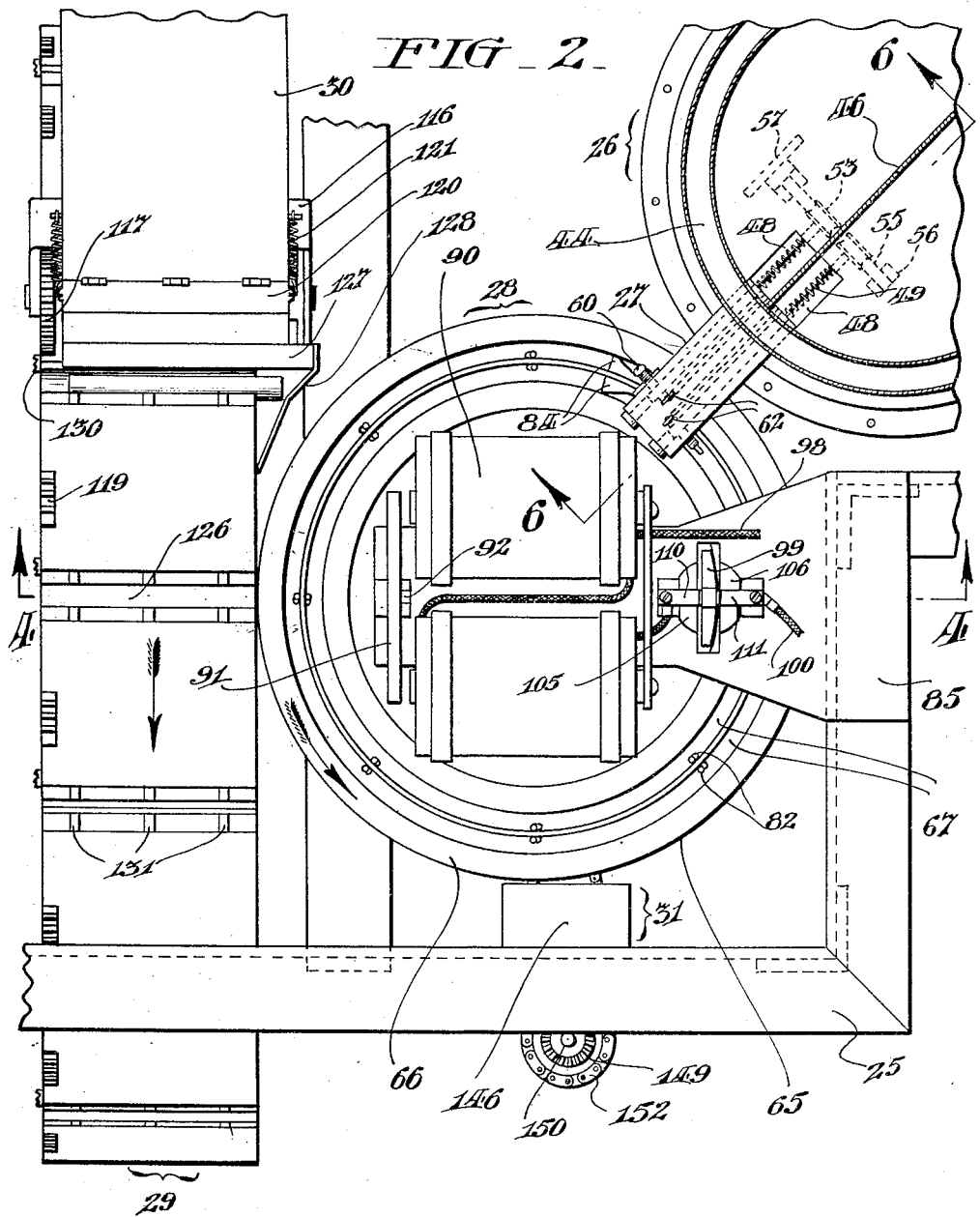

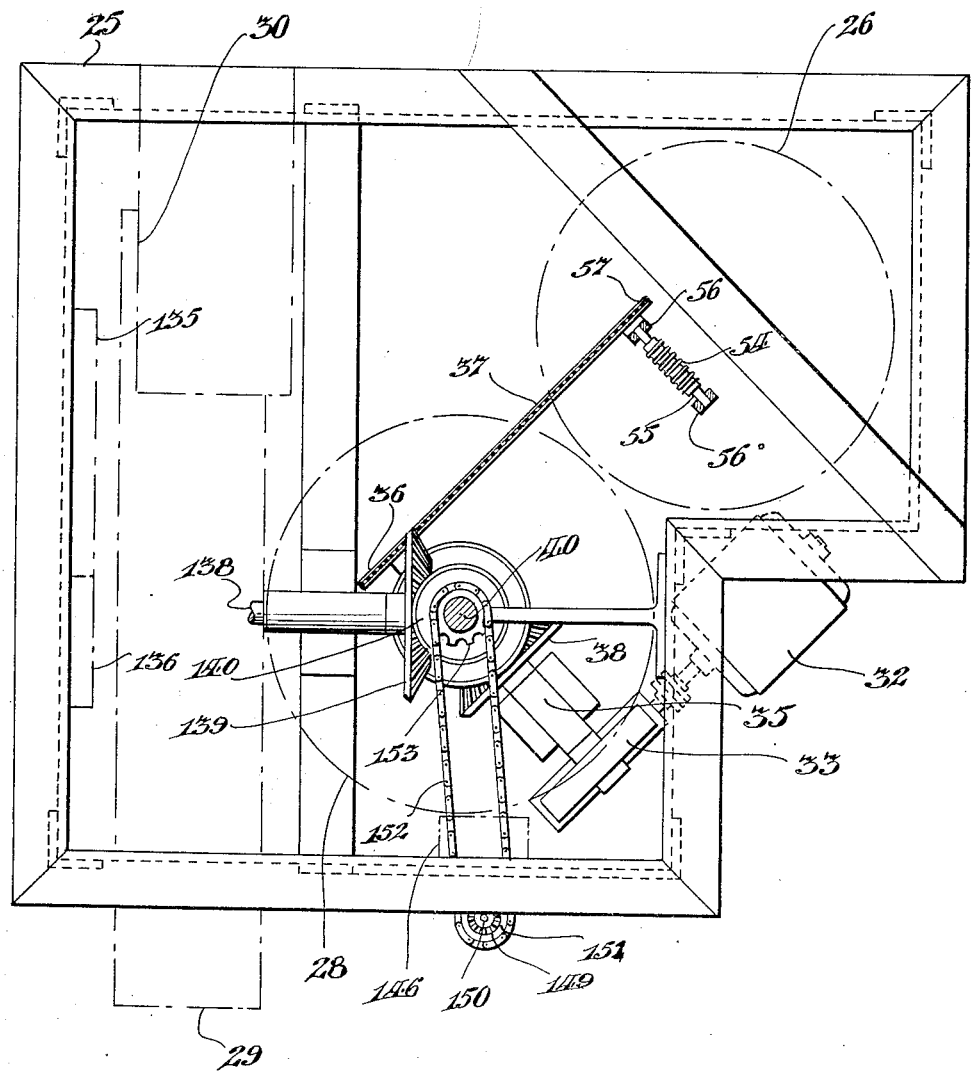

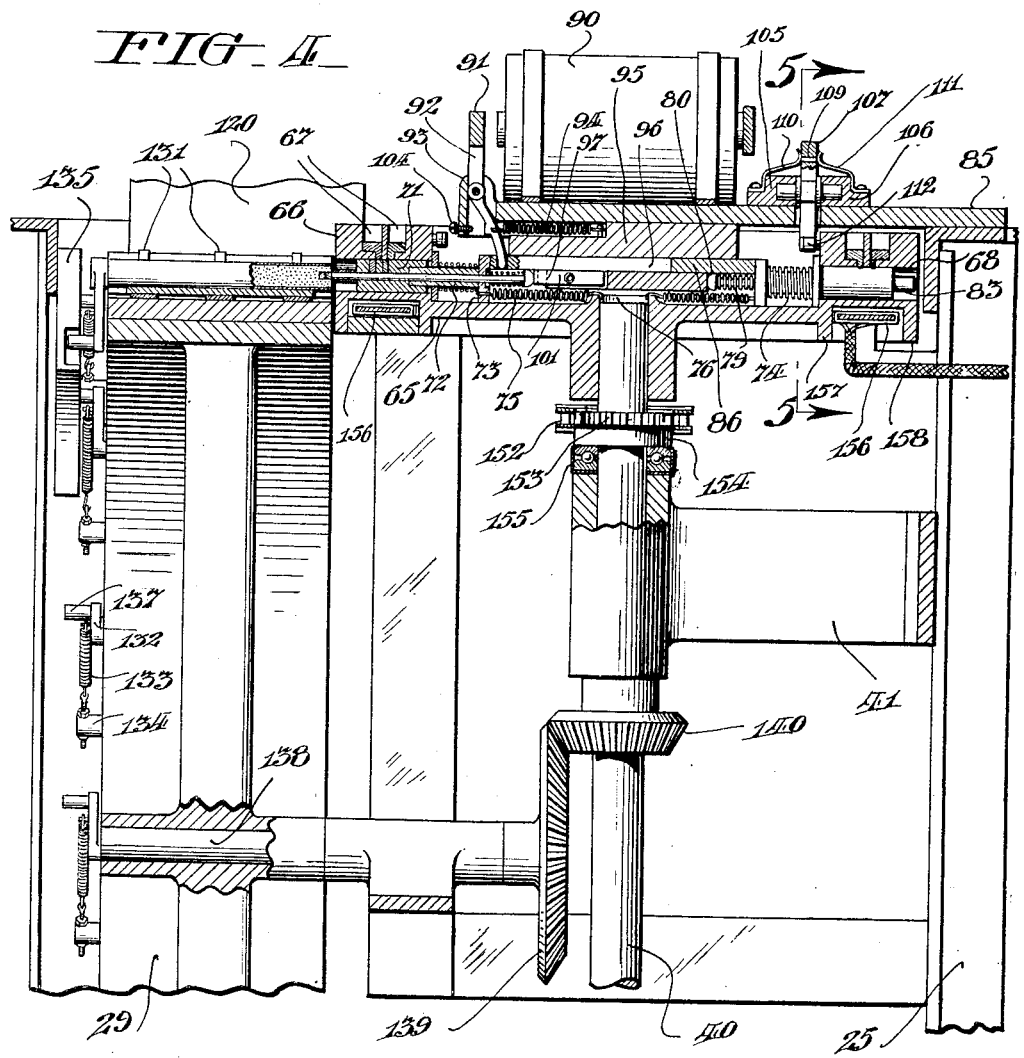
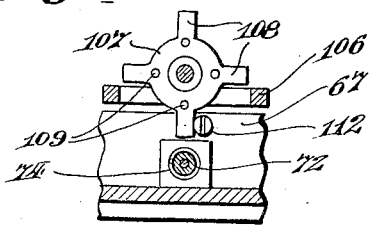

July 19, 1932.　　　W. L. DREW　　　1,868,350
MACHINE FOR PRODUCING SELF IGNITING CIGARETTES
Filed June 13, 1927　　　9 Sheets-Sheet 5
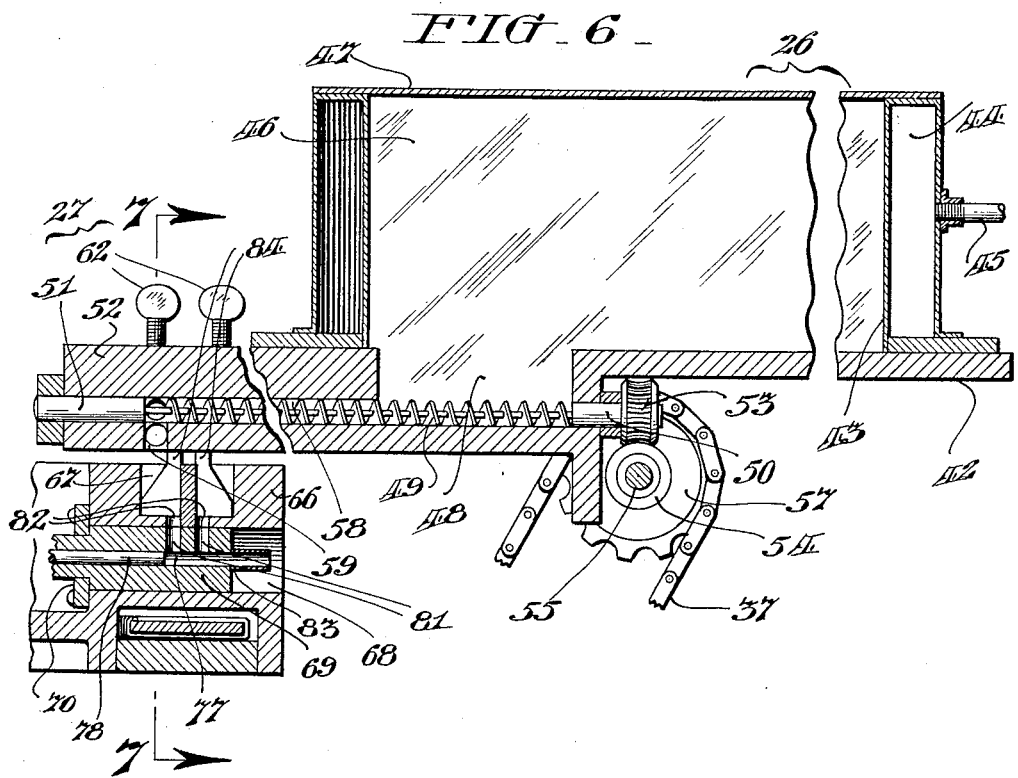
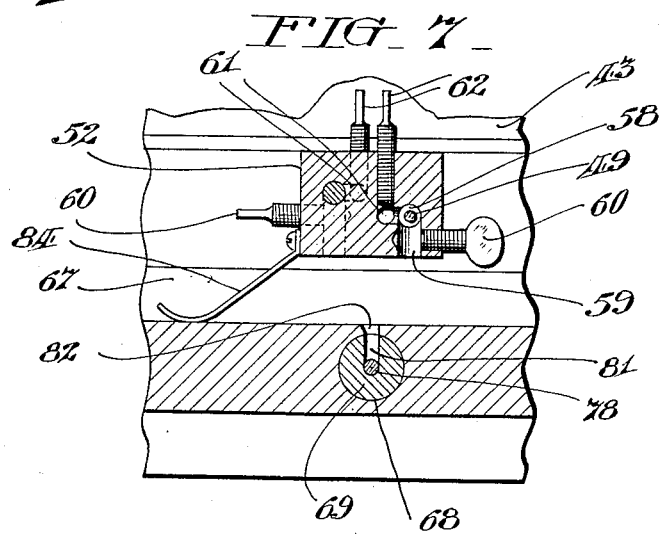
WITNESSES:
INVENTOR:
Walter L. Drew,
BY
Joshua R. H. Potts
ATTORNEY

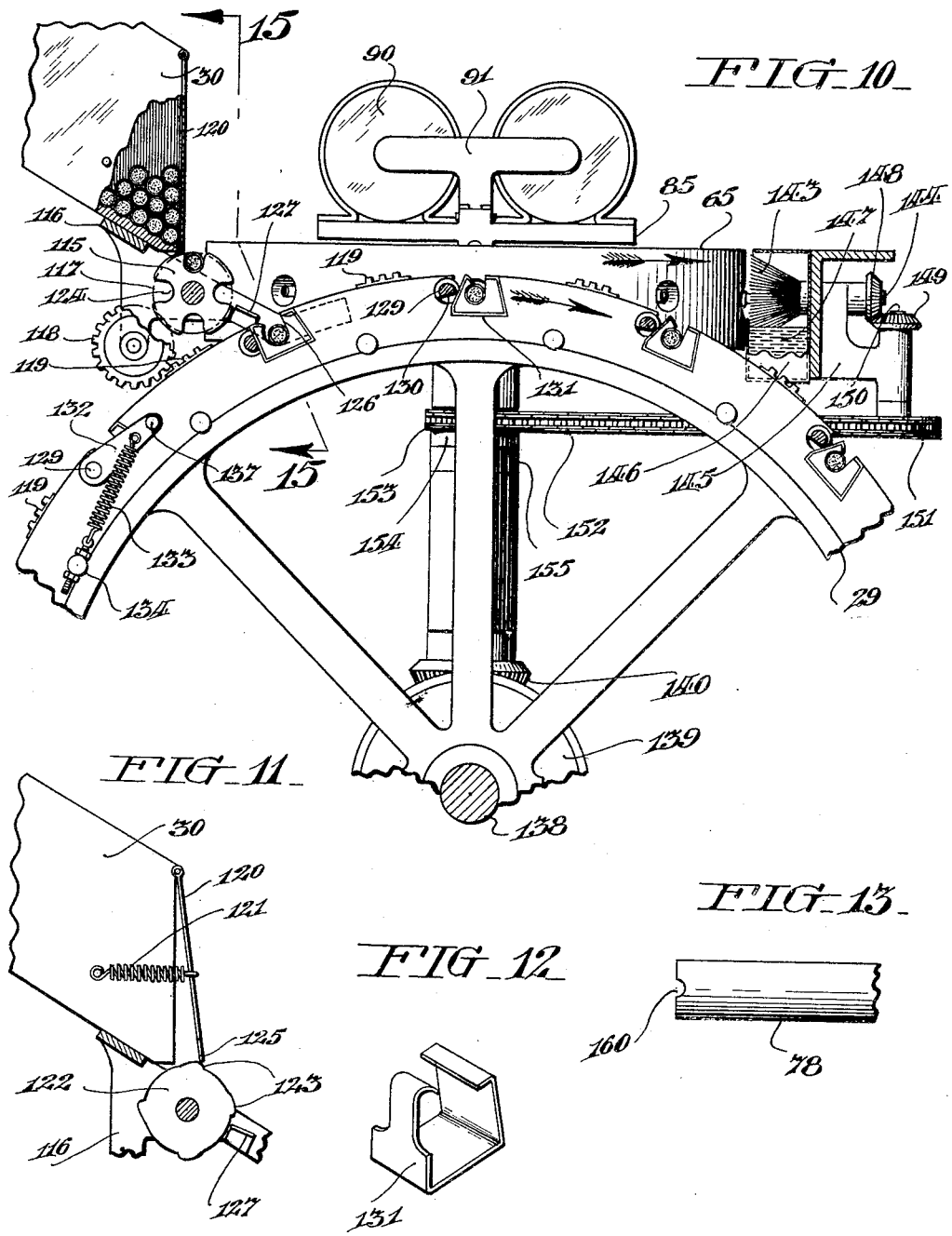

July 19, 1932.  W. L. DREW  1,868,350
MACHINE FOR PRODUCING SELF IGNITING CIGARETTES
Filed June 13, 1927   9 Sheets-Sheet 8

INVENTOR:
Walter L. Drew,

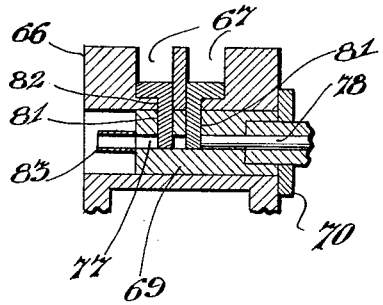
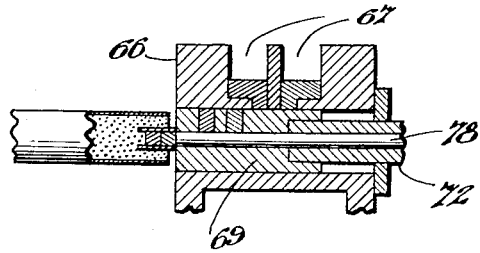
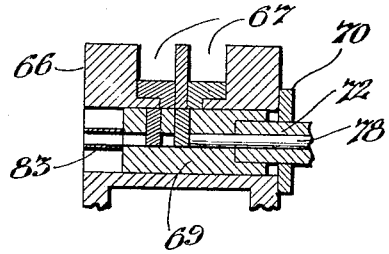
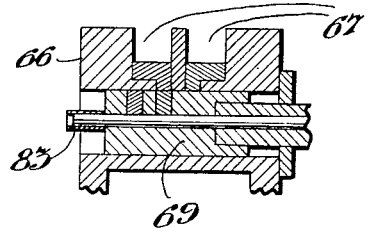
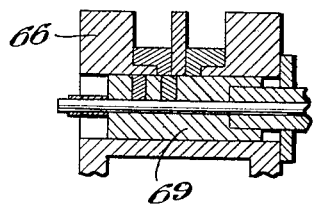
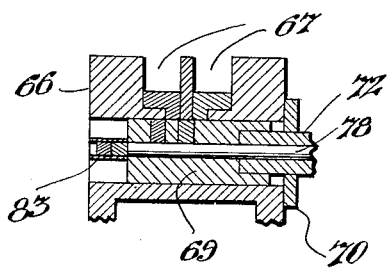
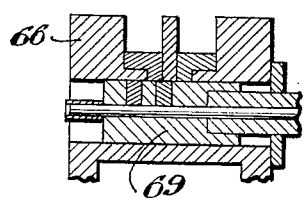

Patented July 19, 1932

1,868,350

UNITED STATES PATENT OFFICE

WALTER L. DREW, OF PALMYRA, NEW JERSEY

MACHINE FOR PRODUCING SELF-IGNITING CIGARETTES

Application filed June 13, 1927. Serial No. 198,616.

My invention relates to machines for producing self-igniting cigarettes and has for its principal object to provide a machine which is adapted to deposit a small amount of igniferous compound in the tips of cigarettes so that they may be ignited by friction in the same manner as are matches.

Another object of my invention is to provide a machine of this character which is thoroughly automatic and which will deposit the compound in the end of each cigarette without danger of mutilating same.

Still another object of my invention is to provide a machine that is compactly built and of small size relative to the number of cigarettes it is capable of handling.

These and various other objects and advantages I attain in the following manner, reference being had to the accompanying drawings in which the several views are drawn to various scales; Figures 1, 3 and 14 being drawn to a small scale; Figures 2, 4, 5, 8 to 11 and 15 to a larger scale; Figures 6, 7, 12 and 16 to 22 to a still larger scale, and Figure 13 to a greatly enlarged scale. In the drawings,—

Figure 1 is an end elevation of a machine embodying my invention,

Figure 2 a top plan view thereof, certain parts being broken away and certain other parts shown in section, and Figure 3 a plan view of the machine frame showing the driving mechanism mounted therein; several of the units being omitted but having their relative positions indicated by dot-and-dash lines.

Figure 4 is a fragmentary vertical sectional view, taken substantially on line 4—4 on Figure 2, Figure 5 a fragmentary sectional view, taken on line 5—5 on Figure 4 and showing certain details of a rotary switch, Figure 6 a central vertical sectional view through the storage and feeding units, taken substantially on line 6—6 on Figure 2, and Figure 7 a fragmentary sectional view taken on line 7—7 on Figure 6.

Figure 10 is a fragmentary side view of the machine, taken substantially on line 10—10 on Figure 1, certain parts being broken away and other parts shown in cross-section.

Figure 11 a fragmentary side view of the cigarette chute, certain parts being shown in cross-section, Figure 12 a perspective view of a certain detail, and Figure 13 a side view of a fragment of one of the plungers.

Figure 1:
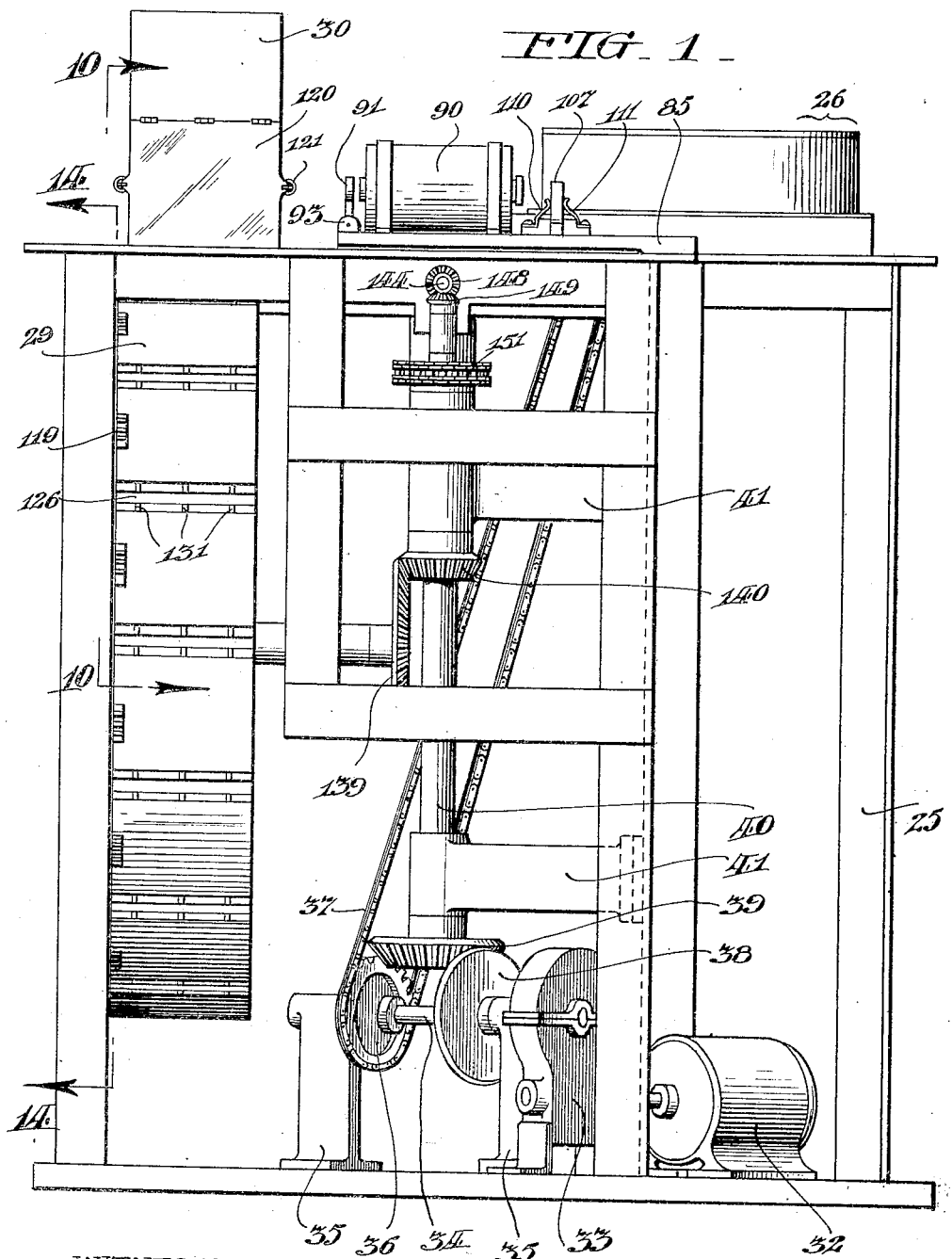
Figure 14:
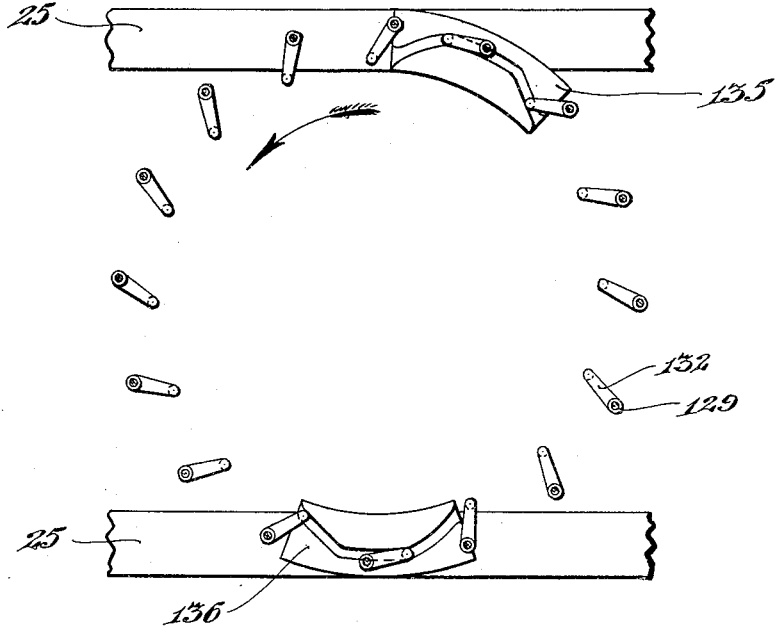

Figure 14 is a sectional view, taken on line 14—14 on Figure 1, showing the arrangement of levers and cams which actuate the cigarette holding devices in the cigarette wheel.

Figure 15:
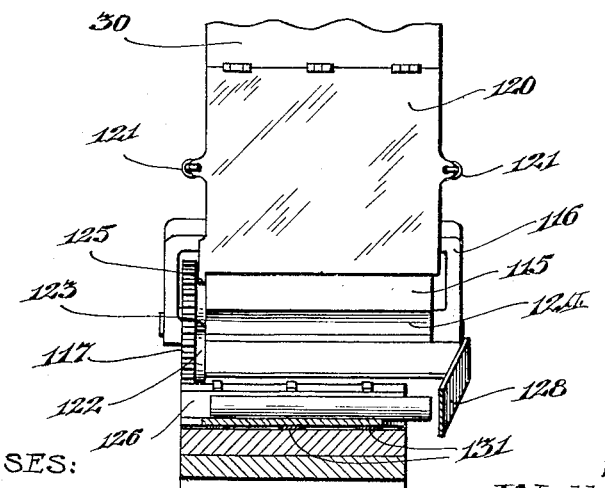

Figure 15 is a sectional view, taken on line 15—15 on Figure 10, showing the end of the cigarette chute and illustrating how a cigarette is deposited in the cigarette wheel.

Figures 16 to 22 inclusive show the relative positions of the charging cartridge and plunger at several points in the cycle of operation.

Referring more in detail to the drawings, the machine has been shown as being mounted in a frame 25 and consisting primarily of a storage unit 26, a compound-feeding unit 27, a distributing unit 28, a cigarette wheel 29, a cigarette chute 30 and a plunger cleaning unit 31. The source of power, for driving the moving parts of all of the several units, has been shown as being a motor 32 mechanically connected to a reduction unit 33 having a shaft 34 extending therefrom and mounted in suitable bearings 35. A sprocket wheel 36 is secured to shaft 34 and is encircled by a chain 37 which transmits power to the feeding unit. A beveled gear 38 is fixed to shaft 34 and meshes with a beveled gear 39 fixed to a vertical shaft 40 rotatably mounted in suitable bearings 41 and motion is transmitted through this shaft for the operation of the moving parts of the other units, as will be described later.

Referring now more particularly to Figures 2, 3, 6 and 7, storage unit 26 has a bed plate 42 upon which is mounted a casing 43 having a steam jacket 44 surrounding its vertical walls and adapted to be provided with steam through an inlet 45. Casing 43 is divided into two equal compartments by a partition 46 and has its top enclosed by a cover 47. A well 48 is formed in bed plate 42 on either side of partition 46 and houses a feed screw 49 forming a part of feeding unit 27.

Feed screws 49 are each provided with a cylindrical portion 50 on one end, which is rotatably mounted in the rear wall of well 48, and with a cylindrical portion 51 which is rotatably mounted in an extension 52 formed on bed plate 42. A worm wheel 53 is fixed to cylindrical portion 50 and meshes with a worm 54 fixed on a shaft 55 rotatably mounted in bearings 56 secured to the under side of bed plate 42. A sprocket wheel 57 is fixed on one end of shaft 55 and encircled by chain 37 so that feed screws 49 may be rotated by the action of motor 32.

A slow burning compound is placed in one compartment of storage unit 26 and an igniferous compound placed in the other compartment; it being evident that each well 48 will be filled with compound as long as any remains in its compartment. Rotation of feed screws 49 will carry the compounds from wells 48 through channels 58, formed in extension 52, and deliver same to the distributing unit through outlets 59 which are formed in the bottom of extension 52 and communicating with channels 58. In order that the quantity of compound delivered by each feed screw 49 may be regulated, I provide two regulating screws 60 which are threaded through extension 52 in such a manner that each may intersect an outlet 59 and thus regulate the size of the opening through which the compound must pass.

As the quantity of compound delivered through each channel 58 is determined by the rate of rotation of feed screws 49, it follows that an excess amount must be fed therethrough in order to assure that the proper quantity is fed through outlets 59 at all times. The excess compound fed through channels 50 is adapted to return to casing 43 by way of a pair of relief channels 61; one of which is disposed adjacent each channel 58 and communicates therewith, as plainly shown in Figure 7. In order that the compound may not pass unobstructed through channels 61 and thus not force the proper quantity through outlets 59, I provide regulating screws 62; each of which is threaded into the extension 52 and adapted to intersect a channel 61 so as to partially obstruct the passage therethrough and to force the desired quantity of compound out of each outlet 59.

Referring now to all the views simultaneously, distributing unit 28 has a distributing wheel 65, fixed to the upper end of shaft 40 and adapted to be rotated thereby, which is provided with an annular rim 66 having a pair of grooves 67 formed therein and so disposed, relative to feeding unit 27, that compound may be fed from storage unit 26 through outlets 59 into these grooves. Rim 66 is provided with a series of radially disposed bores 68 in each of which a cartridge 69 is slidably mounted and held against removal therefrom by a plate 70 secured to the inner edge of rim 66.

Cartridge 69 consists of a body part 71, a neck 72 and a head 73; neck 72 may be secured to body part 71, as shown in Figure 4, or it may be formed integral therewith and head 73 threaded to its outer end. In either case, head 73 should have a flat side engaging the web of wheel 65 so as to prevent cartridge 69 from rotating in bore 68. A coiled spring 74 encircles neck 72 and bears against plate 70 and head 73, so as to normally hold body part 71 against plate 70, and is assisted in this function by a coiled spring 75 having one end secured to head 73 and its other end secured to a boss 76 formed on wheel 65 adjacent the end of shaft 40.

Cartridge 69 is provided with a central longitudinal bore 77 in which is slidably mounted a plunger 78 which is normally held in retracted position by a coiled spring 79 encircling the plunger and bearing against head 73 of cartridge 69 and against the under side of a head 80 formed on the end of the plunger. Two inlets 81 extend upwardly from bore 77 and are adapted to communicate with small apertures 82, formed in the bottoms of grooves 67, so that compound may pass from each groove into bore 77. A nozzle 83 is formed on the end of body part 71 and forms a continuation of bore 77 so that the compound therein may be ejected through nozzle 83 by plunger 78; nozzle 83 being adapted to enter the ends of cigarettes as will be described later.

The amount of each kind of compound is regulated by the size of the inlet 81 through which it passes and the size of bore 77. In order to assure that a full charge is inserted in each cigarette, I provide a pair of spring fingers 84 fixed to extension 52 and bearing against the bottoms of grooves 67 so that the compound is forced through apertures 82 as they pass under the spring fingers; one side of each aperture being sloped to facilitate the packing of the compound therein.

A support 85, secured to the top of frame 25 and extending over distributing wheel 65, has a fixed cam 86, which is adapted to move cartridges 69 in bores 68, attached to its under side by means of bolts 87. A fixed cam 88 is secured to the under side of cam 86 by means of bolts 89 and is adapted to move plungers 78 in bores 77. As distributing wheel 65 rotates, heads 73 of cartridges 69 will ride on the faces of cam 86 and heads 80 of plungers 78 will ride on the faces of cam 88, thus moving both the plunger and the cartridge relatively to rim 66 and to each other in accordance with the variation of the cam faces on these two cams.

These movements are relatively slow and, in order to insert a charge of compound into the end of a cigarette without mutilating same, it is necessary that an instantaneous movement be imparted when the cigarette to be charged comes into alignment with the cartridge. This is accomplished by an electro-magnet 90 mounted on the upper side of support 85 and having an armature 91, fixed to a lever 92 pivoted in a bearing 93 formed on the end of the support, which is normally held away from the magnet core by means of a spring 94 disposed in a groove formed in a filler block 95 secured to the under side of support 85 and having its ends secured to lever 92 and to block 95 respectively. The lower end of lever 92 extends into an aperture formed in a ram 96, slidably mounted in a groove in cam 86, adapted to engage head 73 of cartridge 69 and having a depending lug 97 adapted to engage head 80 of plunger 78. One end of the winding of electro-magnet 90 is connected to a suitable source of electrical energy by a wire 98 and the other end of the winding is connected therewith through a rotary switch 99 and a wire 100. As cartridge 69 aligns with a cigarette, switch 99 closes the circuit so that magnet 90 is energized and attracts armature 91, causing ram 96 to quickly thrust cartridge 69 and plunger 78 forward. Switch 99 is adapted to close the circuit for an instant only and consequently magnet 90 is but momentarily energized so that spring 94 will immediately retrieve lever 92 and ram 96.

In order that cartridge 69 may then be instantly retracted by springs 74 and 75 and plunger 78 remain stationary so as to discharge the contents of nozzle 83 into the end of the cigarette, I provide a spring-pressed dog 101 pivotally mounted in a recess 102, formed in cam 88, and adapted to be thrust behind head 80 by a spring 103. When the plunger is moved to its outer position by lug 97, spring 103 will force the tapered nose of dog 101 behind the rounded head 80 of plunger 78 so that the plunger is held in this position after ram 96 and cartridge 69 have been retracted by their respective springs. As the final outward movement of cartridge 69 should be positively limited, an adjustable stop-screw 104 is threaded into bearing 93 and adapted to engage lever 92 when it is swung by the action of magnet 90.

Switch 99 may be of any suitable construction but has been shown as consisting of blocks 105 and 106, composed of insulating material, mounted on support 85 and having a rotor 107, also composed of insulating material, rotatably mounted therein. Four arms 108 are formed on rotor 107 and four metal inserts 109 extend through the rotor body in fixed relation to arms 108. One end of the winding of magnet 90 is connected to a spring contact 110 which is secured to block 105 and bears against the side of rotor 107. Wire 100 is connected to a similar contact 111 which is secured to block 106 and bears against the side of rotor 107 exactly opposite contact 110 so that, when rotor 107 rotates to bring an insert 109 between contacts 110 and 111, magnet 90 may be furnished with electrical energy. Rotor 107 is actuated by a series of small rollers 112 rotatably mounted on the inner edge of rim 66 in fixed relation to bores 68 so that magnet 90 may be energized at the exact instant that a cigarette is in alignment with a cartridge 69.

Cigarettes are delivered to wheel 29 from chute 30 by means of a grooved cylinder 115 rotatably mounted in a bracket 116 secured to the lower end of the chute. Cylinder 115 is provided on one end with a gear 117 which is adapted to mesh with an idler gear 118 rotatably mounted in bracket 116 and adapted to mesh with rack segments 119 formed on the periphery of wheel 29. The end of chute 30 is closed by a trap door 120, hinged to the chute at its upper edge and normally held in closed position by a pair of springs 121, which is adapted to be periodically opened by a wheel 122 fixed to the end of cylinder 115 and provided with a plurality of projections 123 disposed in fixed relation to the cigarette receiving grooves 124 in cylinder 115 and adapted to abut a lug 125 formed on one corner of the trap door.

Chute 30 is preferably a trifle wider than the length of a cigarette and its bottom slightly corrugated so as to somewhat retard the movement of cigarettes down its inclined bottom surface. If cigarettes are inserted in the chute 30 at a more rapid rate than they are delivered to cigarette wheel 29, they will be inclined to pile up against trap door 120. As cigarette wheel 29 rotates, rack segments 119 will intermittently engage idler gear 118 and rotate cylinder 115 so that a projection 123 will abut lug 125 and swing trap door 120 out sufficiently to allow one cigarette to drop through the aperture thus formed into a groove 124 in cylinder 115. As soon as the cigarette drops into groove 124, projection 123 will ride by the bottom of lug 125 and allow springs 121 to slam trap door 120 shut and thus upset the pile of cigarettes which has accumulated against its inner side. In this way an excessively large pile of cigarettes cannot accumulate against the inner side of trap door 120.

As cigarette wheel 29 continues to rotate, another rack segment 119 will engage idler 118 and the above described process repeated except at this time the cigarette formerly delivered into groove 124 will be deposited in a cigarette receiving channel 126, mounted in the rim of cigarette wheel 29; the cigarette being guided therein by an apron 127 mounted on bracket 116. As many channels 126 may be mounted in the rim of the wheel 29 as is desired but it is to be understood that a rack segment 119 is disposed adjacent each channel so that a cigarette may be deposited therein as rotation of the wheel brings the channel into position relative to cylinder 115.

Chute 30 is preferably located, relative to cigarette wheel 29 so that it will deposit cigarettes in cylinder 115 in such a manner that they extend beyond the inner face of the wheel, as shown in Figure 2. A leveling plate 128 is secured to bracket 116 and extends at an angle toward the inner face of the wheel 29 so that, as this wheel rotates, the ends of the cigarettes deposited in channels 126 will come into contact with the sloping face of leveling plate 128 and be gently but positively moved in channels until their ends are exactly flush with the inner face of the cigarette wheel; this operation occurring immediately after the cigarette has been deposited in channel 126.

Immediately after passing the end of leveling plate 128, the cigarette is clamped in channel 126 by a cam shaft 129 which extends through wheel 29 adjacent each channel 126. This shaft has been shown as having a flat face 130 which is adapted to abut the outside of a spring member 131 when channel 126 is in opened position. Channel 126 is preferably composed of a yielding material, such as soft rubber, and shaped as shown by the channel located beneath apron 127 in Figure 10; it tending to remain in this position due to the elasticity of the material of which it is composed. Spring member 131 nearly surrounds channel 126, as plainly shown in the drawings, and provides a solid surface for the action of the cam edge on cam shaft 129 as well as assuring the opening of the channel when it is released by the cam edged shaft 129.

A lever 132 is secured to the outer end of shaft 129 and has a spring 133 secured thereto and to a fastener 134 fixed to the rim of wheel 29; this fastener being preferably adjustable in order to regulate the tension of the spring. A cam track 135 (see Figure 14) is secured to frame 25 adjacent the upper part of wheel 29 and a cam track 136 is secured to frame 25 adjacent the lower part of wheel 29. A roller 137 is mounted on the outer end of each lever 132 and, as it approaches the end of chute 30, it engages cam track 135 which is so positioned that it will cause lever 132 to rotate cam shaft 129 and allow channel 126 to open in order to receive a cigarette from cylinder 115.

After passing leveling plate 128, roller 137 rides out of cam track 135 and allows spring 133 to rotate cam shaft 129 and close channel 126 so as to hold the cigarette therein firmly in the position in which it is placed by leveling plate 128. As the cigarette reaches the uppermost position on wheel 29, it receives a charge of igniferous substance from cartridge 69 and continued rotation of the wheel carries it downwardly until roller 137 engages cam track 136 which causes shaft 129 to rotate and release the cigarette which falls into a suitable conveyor to be carried away and packed in the usual manner.

Cigarette wheel 29 is fixed on a shaft 138 rotatably mounted in frame 25 and having a beveled gear 139 fixed on its end and meshing with a pinion 140 fixed on shaft 40. The relative ratio of gears 38, 39, 139 and 140 is preferably such that the peripheral speeds of cigarette wheel 29 and distributing wheel 65 are the same so that the cigarette to be charged and the charging cartridge are moving practically parallel to one another and at the same speed at the instant the charge is introduced into the end of the cigarette; it being understood that, in order to accomplish this result, the diameter of cigarette wheel 29 should be considerably greater than the diameter of distributing wheel 65. In the machine shown in the drawings, cigarette wheel 29 and distributing wheel 65 are arranged for rotation in the directions indicated by the arrows shown on Figures 2 and 10.

After cartridge 69 has delivered its charge of compound into a cigarette, it should be cleaned in order to prevent any particles of one compound being mixed with the other compound and to prevent the cartridge or plunger sticking in their respective bores. This is accomplished by bringing the end of plunger 78 in contact with a brush 143 secured to a shaft 144 rotatably mounted in a bracket bearing 145 secured to frame 25. A tank 146 is secured to frame 25 and contains a liquid 147 in which brush 143 is partially immersed so that it may cleanse itself and wash and brush the end of plungers 78 as they successively come into contact with it and liquid 147 may contain a small amount of lubricating substance if so desired. In this manner, the ends of the plunger and nozzle are thoroughly cleaned and coated with a substance which will prevent the compounds from adhering to them. The coating on the end of the plunger adheres to the compound and when it is deposited in the end of a cigarette, consequently if paraffin or a similar substance is used as a lubricant, it forms a moisture-proof coating over the end of the ignition tip.

Shaft 144 has a bevel gear 148 secured thereon and meshing with a bevel gear 149 secured on one end of a shaft 150 rotatably mounted in bracket bearing 145 and having a sprocket wheel 151 secured to its other end. A chain 152 engages sprocket wheel 151 and sprocket wheel 153 fixed to shaft 40 whereby rotation of shaft 40 will cause rotation of brush 143. Sprocket wheel 153 is preferably firmly fixed to shaft 40 and provided with a hub 154 which bears on an anti-friction bearing 155 resting on the top of a bearing 41 so as to support shaft 40 and consequently distributing wheel 65.

The machine illustrated is adapted to have an igniferous compound, which is ignitable by friction, deposited in the right hand compartment of casing 43, so that it may be fed into the inner groove 67 by feeding unit 27, and a slow burning compound deposited in the left hand compartment of casing 43, so that it may be fed into the outer groove 67 by unit 27. It is intended that each cigarette shall receive as large a charge of the slow burning compound as is necessary to insure ignition of the tobacco in the cigarette and only sufficient of the igniferous substance as is required to ignite the slow burning compound. In the embodiment shown, these quantities are regulated by the size of inlets 81 and apertures 82.

These compounds should be free of objectionable fumes when ignited and should harden quickly after being deposited in the cigarette. The two compounds, which I find the most desirable, have the consistency of a thick liquid when heated so that they are readily handled by the machine illustrated. Steam jacket 44 is provided so that the compounds may be kept heated in casing 43 and, in order that they shall not harden until introduced into the cigarette, I provide a heating unit 156 disposed in close proximity to the bottom of rim 66 of wheel 65 and flanked by downstanding flanges 157 and 158 formed on wheel 65. Rim 66 may be heated in any suitable manner but I have shown an electrical heating unit extending around rim 66 so that compound which may pass by fingers 84 will not harden in grooves 67.

Figure 8:
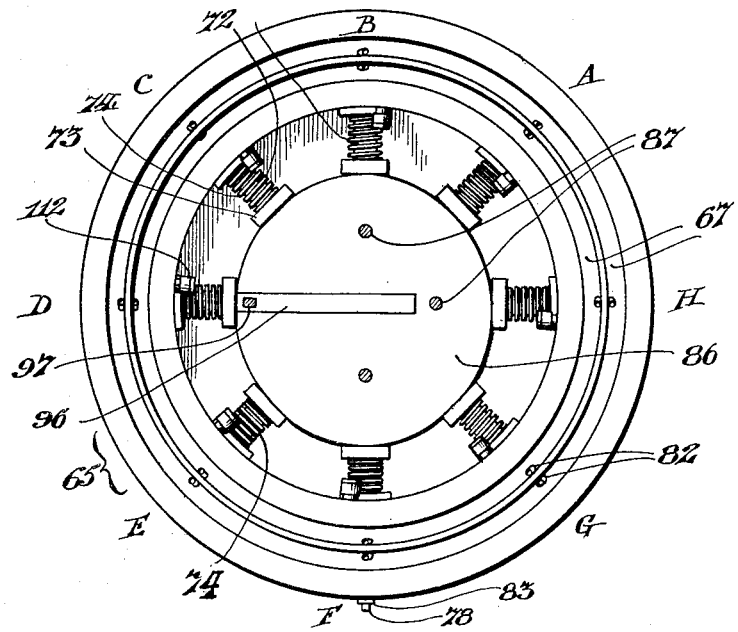
Figure 8 is a plan view of the distributing unit showing the cartridges and cartridge actuating cam; the parts thereabove being omitted.
Figure 9:
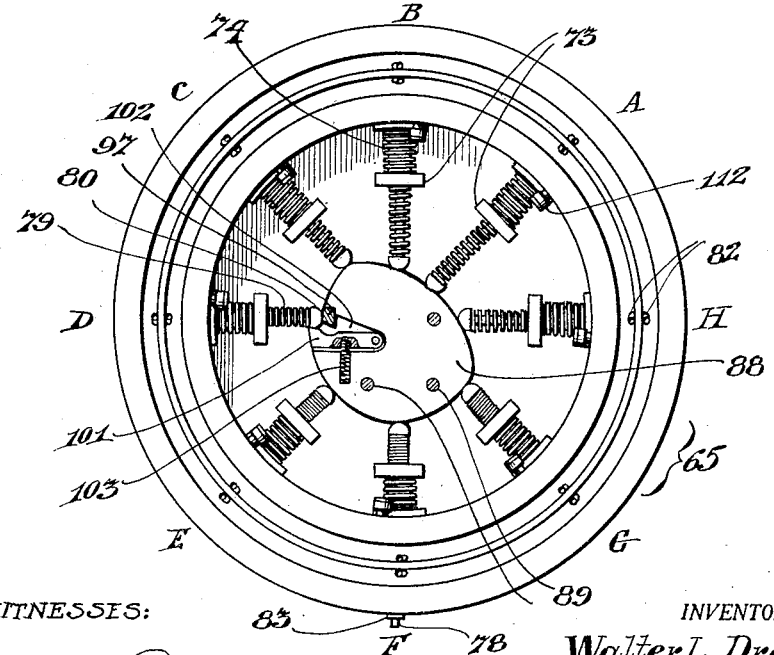
Figure 9 is a plan view of the distributing unit showing the cartridges, plungers and plunger actuating cam; the parts thereabove being omitted.

As cams 86 and 88 are fixed and wheel 65 rotates to bring heads 73 of cartridges 69 and heads 80 of plungers 78 against the various cam faces formed thereon, I have designated eight points on Figures 8 and 9 as stations A, B, C, D, E, F, G and H; the cartridge at station A being in position to receive its charge of compound, the cartridge at station D being in position to discharge its charge of compound into the cigarette held in the channel 126 at the top of wheel 29, the cartridge at station F being in position to be cleaned by unit 31, and the cartridges and plungers at the other stations being in intermediate positions relative to each other and to rim 66.

Now assuming that storage unit 26 is supplied with compounds, cigarettes delivered into chute 30, and the moving parts of the machine actuated by motor 32, the machine would operate as follows: Each feed screw 49 would deliver a fixed flow of compound from its compartment, due to the adjustment of regulating screws 60 and 62, into grooves 67 in distributing wheel 65. As each cartridge arrives at a point adjacent feeding unit 27, which I have designated station A, its inlets 81 will be aligned with corresponding apertures 82 so that, as it leaves this station, spring fingers 84 may force compound into bore 77 through these apertures and inlets, as shown in Figure 16. As wheel 65 rotates, cartridges 69 and plungers 78 will be moved in their respective bores by the action of cams 86 and 88 and at station B, both plunger 78 and cartridge 69 will have been moved forwardly to the positions shown in Figure 17. From station A to station C, cartridge 69 remains in its same relative position but plunger 78 is advanced to the position shown in Figure 18.

From station C to station D, the faces of cams 86 and 88 are on fixed radii so that cartridge 69 and plunger 78 retain their relative positions. As they approach station D, however, head 80 engages dog 101 and swings it toward the far side of recess 102 against the action of spring 103 and rides upon lug 97 while head 73 simultaneously rides upon the end of ram 96.

At this instant, a roller 112 turns rotor 107 so as to bring an insert 109 into and out of contact with contacts 110 and 111, thus momentarily energizing magnet 90 and causing cartridge 69 and plunger 78 to be quickly thrust forward by the action of ram 96 and its lug 97 so that nozzle 83 is inserted into the end of a cigarette, as shown in Figure 19, which wheel 29 has brought into position at this instant.

As magnet 90 is but momentarily energized, ram 96 and cartridge 69 are instantly retracted by their respective springs but plunger 78 is held in its extended position, as shown in Figure 4, by dog 101 which has been inserted behind head 80 by spring 103. The compound, which has been moved from bore 77 into nozzle 83 by plunger 78, is thus deposited in the end of the cigarette; it being understood that the end of plunger 78 comes practically flush with, but does not enter, the end of the cigarette. The end of plunger 78 is provided with a transverse groove 160 which becomes filled with the igniferous compound so that this small amount extends beyond the end of the cigarette and thus facilitates igniting same by friction. Continued rotation of wheel 65 will cause plunger head 80 to ride off the end of dog 81, which has the same contour and is flush with the adjoining face of cam 88, and allow spring 103 to return dog 101 to its normal position. When station E has been reached, both cartridge 69 and plunger 78 have been advanced to the position shown in Figure 20 by the action of cams 86 and 88; when station F has been reached, the cams have moved both the cartridge and plunger to their most extended positions at which time they come into contact with brush 143, which is rotating in liquid 147, and the ends are cleaned of any adhering particles of compound, and, if necessary, are slightly lubricated.

When station G has been reached, both cartridge 69 and plunger 78 have been partially retracted, by the action of their respective springs, to the position shown in Figure 22; when station H has been reached, cartridge 69 and plunger 78 have been retracted approximately half way to their fully retracted position which is reached just before they arrive at station A so that they will be in the positions shown in Figure 16, thus bringing inlets 81 into alignment with apertures 82 in order that a charge of material may be inserted therein and the cycle of operation repeated.

It is evident that as many cartridges may be mounted in distributing wheel 65, within the limits of cams 86 and 88 to produce the necessary movements of cartridge 69 and plungers 78, as is desired. However, I find that eight cartridges are a very satisfactory number to employ in the size of machine illustrated and that production can be satisfactorily increased by merely rotating wheel 65 at a higher speed; it being understood that eight cigarettes are charged during each revolution of wheel 65.

While I have described my invention as taking a particular form, it will be understood that modifications may be made without departing from the spirit thereof, and hence I do not limit myself to the precise construction set forth, but consider that I am at liberty to make such changes and alterations as fairly come within the scope of the appended claims.

I claim:

1. A machine for applying an igniferous tip to a cigarette, comprising cigarette moving means, and mechanism for applying the igniting material thereto during movement.

2. A machine for tipping a cigarette with igniting means, comprising means for holding the cigarette, and mechanism for applying a measured quantity of igniferous substance thereto.

3. A machine for tipping a cigarette with igniting means, comprising means for moving the cigarette, and means actuated for applying substantially equal quantities of igniting means thereto during movement.

4. Means for holding a cigarette, mechanism for charging a cigarette with igniferous substance, means for feeding charges of the igniferous substance to the charging mechanism, and means for actuating the charging mechanism.

5. Means for holding a cigarette, mechanism for charging a cigarette with igniferous substance, means for feeding measured charges of the igniferous substance to the charging mechanism, and means for actuating the charging mechanism.

6. Mechanism for charging a cigarette with igniferous substance, means for receiving a cigarette and moving it into position to be charged, means for feeding charges of the igniferous substance to the charging mechanism, and means for actuating the charging mechanism.

7. A machine of the character described including a charging mechanism having a cartridge adapted to insert an igniferous charge into a cigarette, means for supplying the charging mechanism with the material composing the charge, a device for bringing a cigarette into position to be charged, a device for cleaning the cartridge, and means for actuating the machine.

8. A machine of the character described including a charging mechanism adapted to introduce a quantity of slow burning compound and a quantity of igniferous compound into a cigarette so that the igniferous compound extends beyond the end of the cigarette, means for supplying the charging mechanism with the compounds, a device adapted to receive a cigarette and to move same into position to be charged, and means for actuating the machine whereby the substance will be introduced into the cigarette.

9. A machine of the character described including charging mechanism adapted to introduce a quantity of a substance into a cigarette, means for supplying the charging mechanism with the substance, means for heating the substance while in the machine, a device adapted to receive a cigarette and to move same into position to be charged, and means for actuating the machine whereby the substance will be introduced into the cigarette.

10. A machine of the character described including a distributing unit, a charging device carried by the distributing unit, means for supplying the charging device with a substance, a device adapted to receive a cigarette and to move same into position to be charged, means for aligning the charging device with the cigarette, and means for actuating the charging device whereby the substance therein is introduced into the end of the cigarette.

11. A machine of the character described including a rotatable distributing unit, charging devices carried by the unit, means for supplying the devices with material, a cigarette wheel rotatable at right angles to the plane of the unit and at the same peripheral speed thereof, means for carrying cigarettes at the periphery of the wheel, and means for actuating the machine whereby the charging devices will successively introduce charges of material into successive cigarettes.

12. A machine of the character described including a rotatable cigarette wheel having cigarette clamping means on its periphery, means for feeding cigarettes to the wheel, a distributing unit rotatable at right angles to the cigarette wheel and at the same peripheral speed, mechanism in the distributing unit for inserting igniferous charges into successive cigarettes carried by the cigarette wheel, means for furnishing said mechanism with material composing the charges, and means for actuating the machine.

13. A machine of the character described including a storage tank adapted to contain a substance, means for heating the tank, charging mechanism adapted to introduce a quantity of the substance into the end of a cigarette, means for feeding the substance from the storage tank to the charging mechanism, a device adapted to receive a cigarette and to bring same into position to be charged, and means for actuating the charging mechanism whereby a quantity of the substance will be introduced into the end of the cigarette.

14. A machine of the character described including a storage tank having two compartments each of which is adapted to contain a substance, means for heating the tank, charging mechanism adapted to introduce a quantity of each substance into the end of a cigarette, means for feeding the substances from the storage tank to the charging mechanism, means for keeping the substances warm while in the charging mechanism, a device adapted to receive a cigarette and to bring same into position to be charged, and means for actuating the charging mechanism whereby a quantity of each substance will be introduced into the end of the cigarette.

15. A machine for inserting igniferous charges into the ends of cigarettes including a device adapted to receive cigarettes and bring each into position to receive its charge, a cartridge carrier adjacent said device, a plurality of cartridges slidable therein, means for furnishing each cartridge with an igniferous charge, means for bringing a cartridge into alignment with a cigarette to be charged, and means for causing the cartridge to engage the end of the cigarette and deposit its charge therein.

16. A machine for inserting igniferous charges into the ends of cigarettes including a device adapted to receive cigarettes and bring each into position to receive its charge, a cartridge carrier adjacent said device, a plurality of cartridges slidable therein, a plunger slidable in each cartridge, means for furnishing each cartridge with an igniferous charge, means for bringing a cartridge into alignment with a cigarette to be charged, means for causing the cartridge to engage the end of the cigarette, means for retracting the cartridge, and means for holding the plunger stationary as the cartridge is retracted whereby the charge contained therein is deposited in the end of the cigarette.

17. In a machine of the character described, a cartridge for introducing an igniferous charge into the end of a cigarette including a body part having a longitudinal bore and transversely disposed inlets communicating therewith, whereby an igniferous charge may be inserted through the inlets into the bore, a nozzle fixed on the body part and communicating with the bore, a plunger slidable in the bore and adapted to expel the charge through the nozzle, and a head connected to the body part.

18. In a machine of the character described having a cartridge wheel rotatable therein and provided with a plurality of radial bores, a cartridge in each bore for introducing an igniferous charge into the end of a cigarette including a body part having a longitudinal bore and transversely disposed inlets communicating therewith, whereby an igniferous charge may be inserted through the inlets into the bore, a nozzle fixed on the body part and communicating with the bore, a plunger slidable in the bore and adapted to expel the charge through the nozzle, a head connected to the body part, a spring engaging the head and the wheel for yieldingly holding the cartridge against outward movement, and means for preventing the cartridge from rotating in the bore.

19. In a machine of the character described having a frame, a distributing unit including a distributing wheel rotatable in the frame, a rim on the wheel, a plurality of cartridges slidable in the rim, a plunger in each cartridge, springs tending to hold the plungers and cartridges against outward movement, cams fixed to the frame and engaging the plungers and cartridges, means for rotating the wheel, means for moving each cartridge and plunger suddenly outward as it arrives at a fixed point on the cams, and means for temporarily holding the plunger against the action of its spring.

20. In a machine of the character described having a frame, a distributing unit including a distributing wheel rotatable in the frame, a rim on the wheel, a plurality of cartridges slidable in the rim, a plunger in each cartridge, springs tending to hold the plungers and cartridges against outward movement, a support fixed to the frame, cams fixed to the support and engaging the plungers and cartridges, means for rotating the wheel, an electro-magnet mounted on the support, a lever hinged in the support, a magnet armature secured to the lever, and a ram connected to the lever whereby energizing the magnet will cause the ram to thrust the cartridge and plunger outwardly.

21. In a machine of the character described having a frame, a distributing unit including a distributing wheel rotatable in the frame, a rim on the wheel, a plurality of cartridges slidable in the rim, a plunger in each cartridge, springs tending to hold the plungers and cartridges against outward movement, cams fixed to the frame and engaging the plungers and cartridges, means for rotating the wheel, means for moving each cartridge and plunger suddenly outward as it arrives at a fixed point on the cams, a dog hinged to the cam, and a spring for moving the dog into engagement with the plunger for temporarily holding same against the action of its spring.

22. In a machine for inserting igniferous charges into cigarettes, a distributing unit including a distributing wheel, a rim on the wheel having annular grooves and radially disposed bores formed therein and apertures connecting the bores with the grooves, means for feeding substances into the grooves, cartridges slidable in the bores and having inlets adapted to align with the apertures whereby each cartridge may receive a charge of the substances, means for rotating the wheel, and means for successively thrusting each cartridge into engagement with a cigarette.

23. In a machine having mechanism for inserting charges of material into cigarettes, means for supplying said mechanism with the material to be charged including a tank, a conduit leading from the tank to the charging mechanism, a feed screw in the conduit, and means for rotating the feed screw.

24. In a machine having mechanism for inserting charges of material into cigarettes, means for supplying said mechanism with the material to be charged including a tank having a plurality of compartments, a well in each compartment, a conduit leading from each well to the charging mechanism, a feed screw in each conduit, and means for rotating the feed screws.

25. In a machine having mechanism for inserting charges of material into cigarettes, means for supplying said mechanism with the material to be charged including a tank, a conduit leading from the tank and having an outlet above the charging mechanism, a feed screw in the conduit, means for rotating the feed screw, means for regulating the flow of material through the outlet, and a return conduit connecting the outlet with the tank.

26. In a machine having a device for inserting a charge of material into a cigarette, means for placing the cigarette in position to be charged including a cigarette carrier, cigarette receiving channels mounted in the carrier, means for clamping a cigarette in each channel, and means for moving the carrier whereby each channel comes into alignment with the charging device.

27. In a machine having a device for inserting a charge of material into a cigarette, means for placing the cigarette in position to be charged including a cigarette carrier, cigarette receiving channels mounted in the carrier, a cam shaft in the carrier adjacent each channel, cam faces on the shaft abutting one side of the channel, means normally holding one cam face against a side of the channel for holding a cigarette therein, means for rotating the shaft to bring another cam face against the channel, and means for moving the carrier whereby each channel comes into alignment with the charging device.

28. In a machine for inserting a charge of material into a cigarette, means for placing the cigarette in position to be charged including a rotatable wheel having a rim, a cigarette receiving channel mounted in the rim, a cam shaft adjacent the channel, a face on said cam shaft adapted to bend the side of the channel for holding a cigarette in said channel, means for rotating the wheel, and means for actuating the cam shaft.

29. In a machine for inserting a charge of material into a cigarette, means for placing the cigarette in position to be charged including a rotatable wheel having a rim, a cigarette receiving channel mounted in the rim, a cam shaft adjacent the channel, a face on said cam shaft adapted to bend the side of the channel for holding a cigarette in said channel, a lever fixed to the shaft, a spring engaging the lever and normally holding said face against the side of the channel, a cam track adapted to engage the lever and actuate the cam shaft, and means for rotating the wheel.

30. In a machine for inserting a charge of material into a cigarette, means for placing the cigarette in position to be charged including a rotatable wheel having a rim, a resilient cigarette receiving channel mounted in the rim, a spring channel embracing the resilient channel, a cam shaft adjacent the channel, a face on said cam shaft normally engaging one side of the spring channel and bending same inwardly for holding a cigarette in the resilient channel, means for rotating the wheel, and means for actuating the cam shaft.

31. In a machine of the character described having a cigarette carrier, means for supplying cigarettes to the carrier including a chute connected to a source of supply, a normally closed trap door hinged over the end of the chute, a grooved cylinder rotatably mounted on the end of the chute, lugs on the cylinder adapted to momentarily open the trap door as the cylinder is revolved, and means for rotating the cylinder.

32. In a machine of the character described having a cigarette carrier, means for supplying cigarettes to the carrier including a chute connected to a source of supply, a trap door on the end of the chute, a grooved cylinder rotatably mounted on the chute, lugs on the cylinder adapted to engage and open the door, springs connected to the door for closing it when opened by the lugs, means for rotating the cylinder whereby a cigarette will be deposited therein from the chute, and an apron for guiding a cigarette from the cylinder to the carrier.

33. In a machine of the character described having a cigarette carrier, means for supplying cigarettes to the carrier including a chute connected to a source of supply, a trap door on the end of the chute, a grooved cylinder rotatably mounted on the chute, lugs on the cylinder adapted to engage and open the door, springs connected to the door for closing it when opened by the lugs, a gear connected to the cylinder, and rack segments on the carrier adapted to engage and actuate the gear, whereby the cylinder will be revolved and transfer a cigarette from the chute to the carrier.

34. In a machine of the character described having a cigarette carrier, means for supplying cigarettes to the carrier including a chute connected to a source of supply, a normally closed trap door hinged over the end of the chute, a grooved cylinder rotatably mounted on the end of the chute, lugs on the cylinder adapted to momentarily open the trap door as the cylinder is revolved, means for rotating the cylinder, whereby cigarettes are transferred by the cylinder from the chute to the carrier, and means for positioning the cigarettes in the carrier.

In testimony whereof I have signed my name to this specification.

WALTER L. DREW.